Feb. 2, 1965   F. H. SUMPTION   3,168,335
CONDUIT COUPLING HAVING IDENTICAL HALVES
Filed April 11, 1962

INVENTOR
FREDERICK H. SUMPTION

BY

ATTORNEY

United States Patent Office 3,168,335
Patented Feb. 2, 1965

3,168,335
CONDUIT COUPLING HAVING IDENTICAL
HALVES
Frederick H. Sumption, 3511 Vimy Ridge Ave.,
Norfolk 9, Va.
Filed Apr. 11, 1962, Ser. No. 186,752
6 Claims. (Cl. 285—70)

The present invention realtes to a device for coupling fluid lines or conduits such as a hose to a pipe or the like and the invention more specifically pertains to an assembly wherein the coupling consists of two units which are of complementary construction as distinguished from devices which comprise a plug member and a socket member.

An object of the invention is to provide a coupling wherein the units are of similar construction and which may be readily connected to each other and which in the engaged position form a shroud over the juncture between the coupling units to more effectively seal the connection between the conduit lines and to provide a coupling which is capable of handling higher pressures than couplings of the disconnectable type which are formed of a socket member and a plug member.

Another object of the invention is to provide a coupling wherein two units serve to provide a conduit line connection and which may be readily disconnected and a coupling wherein a normally projecting sleeve of one unit retracts thereinto during a connecting operation to provide space for accommodating the projecting sleeve of the other unit so that abutting ends of the sleeves are displaced from the adjacent ends of the coupling units to increase the strength of the mated units and providing structure facilitating the connection between the conduit lines.

A further object of the invention is to reduce the number of parts required to provide a readily disconnectable type coupling and to provide improvements in the structure of the valve means which serves to close the conduit lines when the coupling units are disconnected.

Other objects and features of the invention will be appreciated and become apparent to those skilled in the art to which the invention pertains as the present disclosure proceeds and upon consideration of the following detailed description taken in conjunction with the accompanying drawing wherein an exemplary embodiment of the invention is disclosed.

Figure 1:
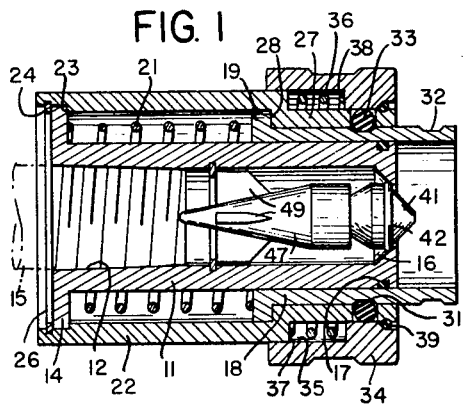
FIG. 1 is a central longitudinal sectional view of a coupling unit exhibiting the invention.
Figure 2:
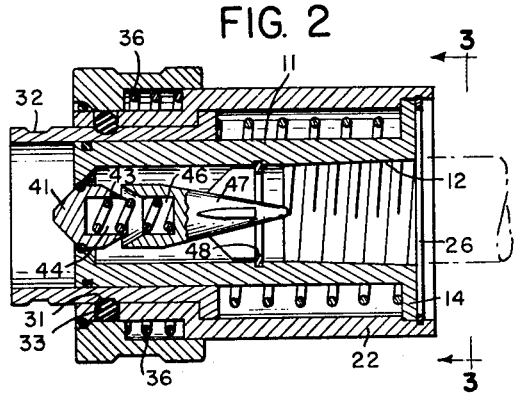
FIG. 2 is a similar view of another complementary and identical coupling unit with portions of the valve structure shown in section.

A coupling assembly for connecting two conduit lines includes two units which are of similar construction and one is shown in FIG. 1 while the other is illustrated in an end-to-end reversed relationship in FIG. 2. Each unit includes a tubular shaped body member 11 which is adapted to receive a conduit such as a hose or pipe 15 in the bore 12 which may be suitably shaped for receiving and attachment of the end portion of a conduit 15. An annular flange 14 which may be formed integral with the body member 11 extends beyond the circumference thereof. The other end of the body member 11 is provided with an inwardly extending frusto-conical surface 16 which defines the perimeter of an opening in the body member 11 and serves as a valve seat as hereinafter described. An annular groove formed in the perimeter of the body member 11 accommodates a seal ring 17.

A generally cylindrical shaped locking and coupling sleeve 18 embraces the body member 11 with its interior surface in close fitting but slidable relationship thereon. The seal ring 17 resiliently engages the inner cylindrical surface of the sleeve 18. An annular flange 19 projects outwardly from the inner end of the sleeve 18 and may be formed integral therewith. A helical spring 21 surrounds the body member 11 and has one end in abutting relationship with the flange 14 while the other end abuts the flange 19. A substantially cylindrical shaped housing member 22 surrounds the tubular shaped body member 11 in spaced relationship to provide an unobstructed annular area for accommodating the spring 21.

The housing member 22 is provided with an annular recess and shoulder 23 which receives the periphery of the flange 14. A retaining ring 24 accommodated in a groove 26 formed in the inner circumference of the housing member 22 maintains the flange 14 in operative relationship with the shoulder 23. The housing member is thus maintained in fixed relationship with the body member 11. The other end portion of the housing member 22 is of a smaller diameter and this portion 27 fits the exterior surface of the sleeve 18. An annular shoulder 28 is formed between the small diameter portion 27 and the major portion of the housing member which forms a stop for the flange 19 limiting axial movement of the sleeve 18 in response to the action of the spring 21 and thereby establishing the projected position of the sleeve.

The locking and coupling sleeve 18 is provided with one circumferentially extending groove 31 in the perimeter thereof and a second circumferentially extending groove 32 in the outer surface which is spaced axially of the sleeve from the groove 31. In the disconnected condition of the units a plurality of balls 33 all have a portion of their spherical bodies in the groove 31 and held therein by means of a cam collar 34. The balls 33 are carried by the housing member and arranged for radial movements in suitable and conventional openings. The inner circumference 35 of the collar 34 is slightly greater than the periphery of the main portion of the housing member 22. Such structure provides an annular space between the collar 34 and the housing portion 27 for accommodating a helical spring 36. One end of the spring 36 abuts a shoulder 37 on the housing member and the other end of the spring abuts a shoulder 38 formed on the interior of the collar 34. The collar 34 is thus urged to the right in FIG. 1 by the spring 36 and is maintained in position illustrated in FIG. 1 by means of a retaining ring 39. In this position the collar cams the balls 33 into the groove 31.

Each unit of the coupling may be provided with a valve mechanism for closing the opening 16 when the units are disconnected. It is for this purpose that a valve piece 41 having a conical free end portion with a gasket ring 42 thereon is mounted so as to be resiliently urged to the position shown in FIG. 2 by means of a helical spring 43. The spring 43 is accommodated in a cylindrical cavity 44 formed within the valve piece 41 and in a cylindrical cavity 46 formed within a centrally mounted support member 47. The member 47 is maintained within the body member 11 by means of a retaining ring 48 and a plurality of spider arms 49 which extend radially from the member 47. This valve mechanism is so shaped as to avoid turbulence in the fluid flowing through connected units. The spring 43 is attached to the valve piece 41 within the cavity 44 and the spring is also attached to the support member 47 within the cavity 46. The frusto-conical shaped surface 16 forms a valve seat for the valve piece 41. In the extended position of the valve piece 41 as shown in FIG. 2 the inner end is nevertheless within a flared mouth of the cavity 46. The valve piece 41 is free to shift laterally to a limited extent as permitted by the flexibility of the spring 43. The frustoconical surface 16 defining the opening in the body member 11 guides the valve piece to cause the gasket ring 42 to effectively engage the valve seat surface.

In operation and when it is desired to connect two units and provide a connection from one fluid line to another either the unit shown in FIG. 1 or the unit shown in FIG. 2 may serve as a receiving member. In order to attain the connected condition illustrated in FIG. 4 the collar 34 of the unit shown in FIG. 1 is retracted against the action of its spring 36. This permits all spherical portions of the balls 33 to escape from the groove 31. The collar 34 is held in the retracted position and the end of the projecting locking and coupling sleeve 18 of the unit shown in FIG. 2 is brought into abutting relation with the end of the sleeve 18 of the unit shown in FIG. 1. The sleeve of the unit shown in FIG. 2 is not unlocked and is employed to apply force on the free end of the sleeve 18 of the unit shown in FIG. 1 so that it is retracted to the position shown in FIG. 4 and the spring 21 is compressed. The locking and coupling sleeve 18 of the other unit then enters the annular space between the body member 11 and the housing member 22 of the unit shown at the left in FIG. 4. When the ends of the body members 11 are in abutting relationship as shown in FIG. 4 the collar 34 of the unit on the left is released and the spring 36 shifts the cam collar to urge the balls 33 into the groove 32 in the sleeve 18 of the opposite unit and to thereby retain the units in coupled relationship.

Figure 4:
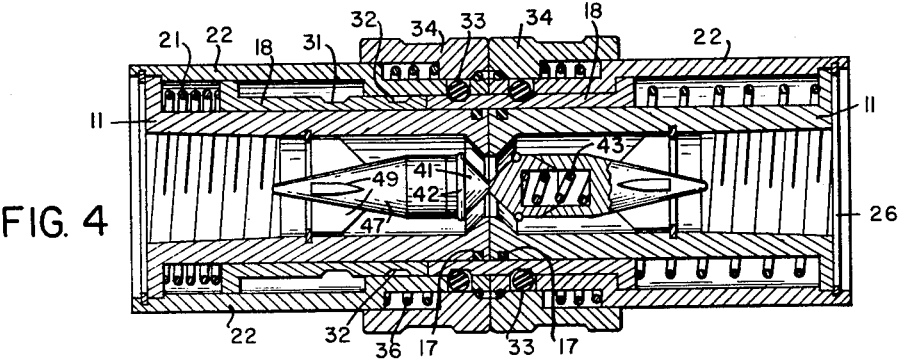
FIG. 4 is a central longitudinal sectional view of the coupling units in a connected condition.

It will be observed from a consideration of FIG. 4 that the abutting ends of the locking and coupling sleeves 18 are displaced from the abutting ends of the units. This provides an uninterrupted portion of a sleeve about the free ends of body members 11 and within the housing members to strengthen the structure of the coupling in this area. The sealing ring 17 of each unit both engage the inner surface of the sleeve 18 of the unit shown at the right in FIG. 4 which improves the sealing of the junction between the units. The balls 33 are desirably spaced from the end of each unit a distance equal to one-half of the axial dimension between the grooves 31 and 32. This insures abutting engagement of the ends of the connected units.

Figure 5:
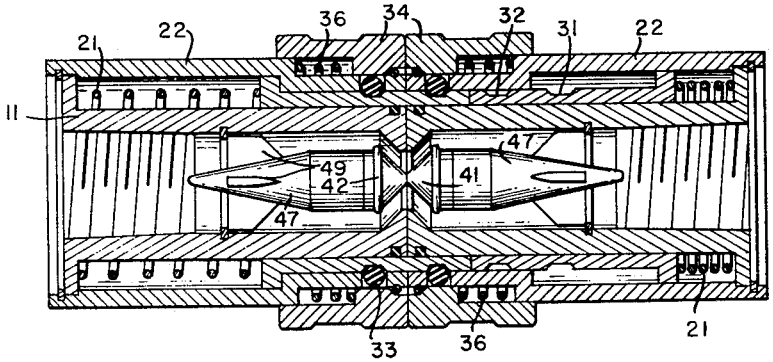
FIG. 5 is an axial sectional view showing the units in another connected condition.
Figure 3:
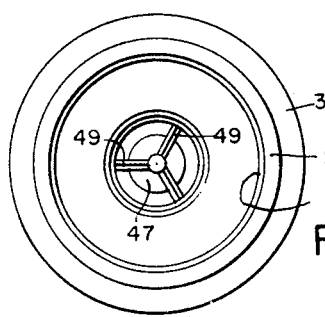
FIG. 3 is an end view taken on the line 3—3 of FIG. 2.

The unit shown in FIG. 2 may serve as the receiving member in bringing the units into a coupled relationship as shown in FIG. 5. In developing this connected condition the collar 34 on the unit shown in FIG. 2 is retracted against the action of its activating spring 36. This frees all of the balls 33 from the groove 31 of the unit shown in FIG. 2. Thus the projecting sleeve 18 of the unit shown in FIG. 1 may be employed to retract the sleeve 18 of the unit shown in FIG. 2. The projecting sleeve of the unit shown in FIG. 1 then enters the annular space between the body member 11 and the housing member of the unit shown in FIG. 2 so that upon release of the retracted cam collar 34 the balls will enter the groove 32 in the sleeve 18 of the unit shown at the left to provide the connected and coupled relationship shown in FIG. 5.

As the units are brought into coupled relationship the noses of the valve pieces 41 engage each other to compress the respective springs 43 whereby these plugs are retracted in the respective units to provide for free movement of the liquid or fluid through the coupled units.

While the invention has been illustrated and described in connection with particular structural elements in one relationship it will be appreciated that changes may be made in the components as well as the overall assembly. Such modifications and others may be made without departing from the spirit and scope of the invention as set forth in the appended claims.

What I claim and desire to secure by Letters Patent is:

1. A coupling assembly for fluid lines comprising, complementary coupling units each including a tubular shaped body member and a sleeve surrounding and slidable axially on said body member and detent means carried by said tubular member, each sleeve being slidable on its tubular member to a projected position with its free end positioned beyond the free end of the associated body member, each sleeve having axially spaced inner and outer grooves in the same wall of the sleeve, each detent means including means engaging the associated sleeve in its inner groove when the sleeve is in an outer projected position releasably locking the sleeve with respect to its body member, the center of the outer groove in each sleeve when in the projected position being spaced beyond the free end of its body member a distance at least as great as the spacing of the free end of the other body member from the center of the groove engaging means thereon, each sleeve being retractable relative to its body member to a position with its free end axially spaced from the groove engaging means thereon a distance as great as the axial spacing of the outer groove from the free end of each sleeve, and each of said groove engaging means being spaced from the free end of its body member whereby the groove engaging means on one unit may engage the associated sleeve in its inner groove with the groove engaging means on the other unit engaging the same sleeve in the outer groove thereof.

2. A coupling assembly for fluid lines according to claim 1 including means on each unit limiting outer projection of the associated sleeve.

3. A coupling assembly for fluid lines according to claim 1 wherein the spacing of the groove engaging means from the free end of the associated body member is substantially equal to one-half the axial spacing between the inner and outer groove of each sleeve.

4. A coupling assembly for fluid lines according to claim 1 including a sealing ring carried by the periphery of each body member adjacent the free end thereof for engagement by the inner surface of either sleeve.

5. A coupling assembly for fluid lines according to claim 1 including a housing member surrounding the body member on each unit providing space therebetween accommodating the associated sleeve.

6. A coupling assembly for fluid lines according to claim 1 including resilient means on each unit urging the associated sleeve to the outer projected position.

References Cited by the Examiner
UNITED STATES PATENTS

| | | | |
|---|---|---|---|
| 2,689,143 | 9/54 | Scheiwer | 285—316 |
| 2,819,914 | 1/58 | Eitner | 285—277 |

CARL W. TOMLIN, *Primary Examiner.*